United States Patent
Potakowskyj et al.

(10) Patent No.: US 8,749,889 B2
(45) Date of Patent: Jun. 10, 2014

(54) HEAD UP DISPLAY (HUD) SYSTEM WITH A SERVICE POSITION FOR EASY DISPLAY ASSEMBLY REPLACEMENT

(75) Inventors: Christoph Potakowskyj, Vienna (AT); Henricus Marie Ruyten, Gumpoldskirchen (AT); Alois Huber, Vienna (AT); Peter Landbauer, Moedling (AT)

(73) Assignee: Jabil Circuit, Inc., St. Petersburg, FL (US)

( * ) Notice: Subject to any disclaimer, the term of this patent is extended or adjusted under 35 U.S.C. 154(b) by 272 days.

(21) Appl. No.: 13/162,314

(22) Filed: Jun. 16, 2011

(65) Prior Publication Data

US 2011/0242668 A1  Oct. 6, 2011

Related U.S. Application Data

(63) Continuation-in-part of application No. 12/239,384, filed on Sep. 26, 2008, now Pat. No. 7,978,414.

(60) Provisional application No. 61/355,220, filed on Jun. 16, 2010.

(51) Int. Cl.
  *G02B 27/14* (2006.01)
(52) U.S. Cl.
  USPC .......................................... 359/630
(58) Field of Classification Search
  USPC ......................................... 359/630, 443–446
  See application file for complete search history.

(56) References Cited

U.S. PATENT DOCUMENTS

| | | | |
|---|---|---|---|
| 4,108,025 A | * | 8/1978 | Stine et al. ....................... 81/484 |
| 5,204,666 A | | 4/1993 | Aoki et al. |
| 5,519,553 A | | 5/1996 | Hashimoto et al. |
| 7,528,798 B2 | | 5/2009 | Harada et al. |
| 2008/0285138 A1 | * | 11/2008 | Lebreton ....................... 359/630 |

FOREIGN PATENT DOCUMENTS

WO  WO-2007/057608  5/2007

OTHER PUBLICATIONS

Non-Final Office Action on U.S. Appl. No. 12/239,384, mailed Oct. 7, 2010.
Notice of Allowance on U.S. Appl. No. 12/239,384, mailed Apr. 6, 2011.

* cited by examiner

*Primary Examiner* — James Jones
(74) *Attorney, Agent, or Firm* — Foley & Lardner LLP

(57) ABSTRACT

A head up display (HUD) system includes a housing, a display assembly, and a mechanical guide system. The housing contains optical and electronic components that support a head up display function. The display assembly is captured by the housing. The display assembly has a display element for conveying head-up display information and a carrier that structurally supports the display element. The mechanical guide system moves and guide the display assembly to an in-use position, a storage position, and a service position. When in the service position, the display assembly is removable from the housing without disassembly of the housing. When not in said service position, the display assembly can be movable between an in-use position (in which the display element is substantially exposed outside the housing but is physically secured by the housing) and a storage position (in which the display assembly is substantially enclosed and protected by the housing).

25 Claims, 7 Drawing Sheets

Storage Position with Stopper Mechanism Engaged  205

Display Position with Stopper Mechanism Engaged  250

Storage Position with Stopper Mechanism Disengaged   305

Eject Position with Stopper Mechanism Disengaged   350

HEAD UP DISPLAY (HUD) SYSTEM WITH A SERVICE POSITION FOR EASY DISPLAY ASSEMBLY REPLACEMENT

CROSS REFERENCE TO RELATED APPLICATIONS

This application claims the benefit of Provisional Application Ser. No. 61/355,220 entitled "Mechanism for a Head Up Display allowing change of the Mirror", filed Jun. 16, 2010 and claims the benefit of application Ser. No. 12/239,384 titled "Positioning System for a Combiner in a Head Up Display", which are herein incorporated by reference in its entirety.

BACKGROUND

The present invention relates to the field of head up displays (HUDs) and, more particularly, to a head up display system with a service position for easy display assembly replacement.

Head Up Display (HUD) systems are used in vehicles to provide information to drivers/pilots within their immediate viewing area so that the driver/pilot need not look away and, therefore, refocus in order to read the information provided by the gauges or instruments. In a typical HUD system, the auxiliary data is displayed upon a display element, such as a specialized transparent panel that reflects light. The display element can be an extremely fragile optical surface, where even slight scratches can significantly impact effectiveness of the display element.

Situations arise in which the display element needs to be removed from the HUD system, such as routine maintenance or replacement. The replacement and maintenance is typically performed by trained professionals. It is not uncommon, however, for the display element to be damaged, when it is inserted in the housing of the HUD system. Damage results from the display element being fragile, having to fit in a tight and crowded housing, and a relatively low tolerance for correct insertion into the HUD system. Further, existing systems require the HUD housing to be dissembled to remove/replace the display element, which can be a cumbersome and expensive maintenance procedure.

BRIEF SUMMARY

One embodiment of the disclosure is for a head up display (HUD) system that includes a housing, a display assembly, and a mechanical guide system. The housing contains optical and electronic components that support a head up display function. The display assembly is captured by the housing. The display assembly has a display element for conveying head-up display information and a carrier that structurally supports the display element. The mechanical guide system moves and guide the display assembly to an in-use position, a storage position, and a service position. When in the service position, the display assembly is removable from the housing without disassembly of the housing. When not in said service position, the display assembly can be movable between an in-use position (in which the display element is substantially exposed outside the housing but is physically secured by the housing) and a storage position (in which the display assembly is substantially enclosed and protected by the housing).

One embodiment of the disclosure is for an apparatus for facilitating maintenance of a display assembly. The apparatus can include a system housing representing a physical enclosure containing a mechanical guide system, wherein said system housing comprises an opening through which a display element selectively protrudes. The mechanical guide system is used for moving a display assembly to an in-use position, a storage position, and a service position. When the display assembly is in the in-use position, the display element protrudes from the opening of the system housing so that a user is able to view visual data selectively presented on the display element. When the display assembly is in the storage position, the display element is at least partially contained within the system housing, and when the display assembly is in the service position, the display element is able to be removed or replaced without disassembling the system housing.

One embodiment of the disclosure is for a method for replacing a display assembly of a HUD system. In the method, an ejection mechanism of a head up display (HUD) system can be activated. The ejection mechanism can utilize an adjustable stopper mechanism for limiting movement of a display assembly within the HUD system, such that activation of the ejection mechanism changes the stopper mechanism from an engaged state where the display assembly is not able to be ejected to a disengaged state where the display assembly is able to be ejected. The display assembly can include a carrier and a display element. Responsive to activating the ejection mechanism, the display assembly can be ejected through an opening in a housing of the HUD system. The display assembly can be removed from the opening of the HUD system. The opening of the HUD system can be the same opening from which the display element protrudes when the HUD system is in an in-use position. A different display assembly can be inserted into the opening of the HUD system. The different display assembly can replace the display assembly that was ejected. After inserting the display assembly, a state of the adjustable stopper mechanism can be changed from the disengaged state to the engaged state.

DETAILED DESCRIPTION

The present invention discloses a solution that includes a service position for a head up display (HUD) system, which also has an in-use position (in which a display element is positioned for viewing) and a storage position (in which the display element is positioned within a HUD housing for safekeeping). The display element can be a fragile optical surface.

This display element can be attached to a carrier, which adds rigidity, where the combination of the carrier and display element is referred to herein as a display assembly. In one embodiment, an adhesive or glue can be used to affix the display element to the carrier; other coupling mechanisms are contemplated in other embodiments.

When placed in the service position, a display assembly can be easily removed from the HUD system. That is, the service position is designed to permit a technician (or even an end-user) to remove and replace the display assembly. In one embodiment, for example, the service position can be an ejection position, where the display assembly is ejected from the HUD system. In another embodiment, a relatively simple adjustment, such as releasing a hinge joint or unscrewing an exposed screw, can be used to selectively remove/replace the display assembly. Conventional HUD systems lack a service position and require a housing of the HUD system to be disassembled in order to remove the display assembly.

Figure 1:
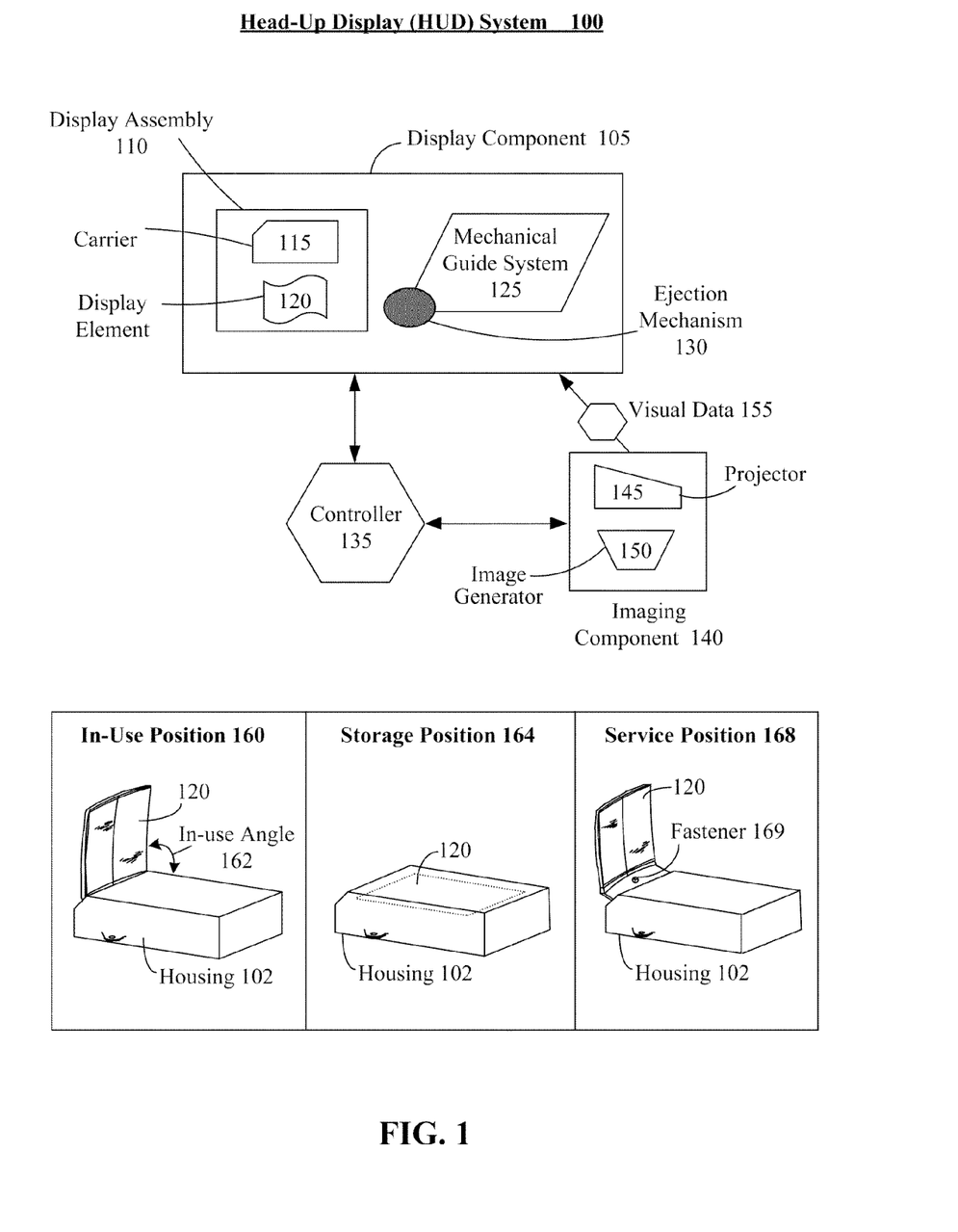
FIG. 1 is a diagram of a Head Up Display (HUD) system that supports a simplified removal/replacement process for a display element and/or a display assembly in accordance with embodiments of the inventive arrangements disclosed herein.

Referring to the figures, FIG. 1 is a schematic diagram of a Head Up Display (HUD) system 100 that supports a simplified removal/replacement process for a display element 120 and/or a display assembly 110 in accordance with embodiments of the inventive arrangements disclosed herein. The HUD system 100 can include a display component 105, a controller 135, and an imaging component 140. The display component 105 can include display assembly 110, and mechanical guide system 125. In one embodiment, an ejection mechanism 130 can also be included in system 100.

In one embodiment, the display component 105, the controller 135, the imaging component 140, and the like can be optical and electronic components supporting head up display function(s) that are contained in a housing (e.g., housing 102) of the HUD. For example, when the display element 120 is implemented as mirror or other reflective surface, the optical and electronic components contained in the housing 102 can generate video data 155, which is projected (i.e., by projector 145) onto the display element 120 (when in in-use position 160) so that a user can view the reflected visual data 155.

The HUD system 100 can include multiple different positions, such as in-use position 160, storage position 164, and service position 168. In in-use position 160, the display element 120 can be presented within a field of view of a user. For example, an in-use angle 162 of approximately ninety degrees can exist between the display element 120 and a housing 102 of the HUD system 110. Other in-use angles 162 are contemplated. For example, the in-use angle 162 can be adjusted for line-of-sight alignment in one embodiment. When in the in-use position 160, the display element 120 can be substantially exposed outside the housing 102 but can be still be physically secured by the housing 102 or by in-housing components (such as mechanical guide system 125 components).

When in storage position 164, the display element 120 can be protected from inadvertent damage. In one embodiment, the display element 120 can be protected by the housing 102 when in the storage position 164. That is, at least some level of protection is afforded by the housing 102 that prevents damage to the display element 120 when in the storage position 164, compared to a lesser degree of protection afforded to the display element 120 when in the in-use position 160. In one embodiment, the display element 120 can be entirely or substantially enclosed and protected by the housing 102 when in the storage position 164.

When in the service position 168, the display element 120 and/or the entire display assembly 110 can be exposed so that coupling/decoupling the display element and/or the display assembly 110 is relatively easy (relative compared to the in-use position 160 and/or storage position 164). For example, when in the service position 168, the display assembly 110 can be removable from the housing 102 without disassembly of the housing 102. In one embodiment, an ejection mechanism 130 is contemplated that ejects the display assembly 110 (and/or display element 120) from the housing 102. In another embodiment, a fastener 169 joining the display assembly 110 (and/or the display element 120) can be exposed when in the service position 168, where in any other position (in-use position 160, storage position 164, or intermediate positions between the in-use position 160 and storage position 164) the fastener 169 is not exposed or easily accessible. For example, a screw, clamp, or other mechanism can be the fastener 169 that is only exposed when in the service position 168.

The controller 135 can represent the hardware and/or software elements required to control and coordinate the execution of commands by the display component 105 and/or imaging component 140. The controller 135 can be configured to receive input commands (and/or electronic signals) from a user or auxiliary system and translate those input commands into executable instructions for the components 105 and/or 140 of the HUD system 100. Thus, the controller 135 can cause the HUD system 100 to move among the various positions 160, 164, 168 responsive to user activation and/or system events.

For example, in an automotive scenario, the controller 135 of the automobile can cause the HUD to be placed in the in-use position 160 when the automobile is started and/or to be placed in the storage position 164 when the automobile is turned off. In another example, the driver can press a set of buttons or switches on the car's dashboard to change a state of the HUD 100 to the in-use position 160, to the storage position 164, and/or to the service position 168.

The imaging component 140 can represent the hardware and/or software elements that provide visual data 155 to the display component 105 for presentation upon the display element 120. In one embodiment, the imaging component 140 can include an image generator 150 and a projector 145. For example the display element 120 can be a minor, which reflects light from the projector 145 into a user's line-of-sight. In another embodiment, the display element 120 can be a transparent, semitransparent, or opaque electronic matrix display (e.g., a liquid crystal display, organic light-emitting diode (OLED), surface-conduction electron-emitter display (SED), a liquid crystal on silicon (LCOS), electrophoretic ink (e-ink), etc.) that is electronically connected to the image generator 150.

The mechanical guide system 125 can represent the components used to position the display assembly 110 (and/or the display element 120), as the state of the HUD changes from the in-use position 160, the storage position 164, and/or service position 168. The mechanical guide system 125 can utilize rails, adjustment arms, and other components to guide/move the display assembly 110 (and/or display element 120) between the positions 160, 164, and 168.

In one embodiment, the mechanical guide system 125 can include an ejection mechanism 130, which ejects the display assembly 110 (and/or the display element 120) when the HUD is in the service position 168. The ejection mechanism 130 can be an automated mechanism, a manual mechanism, and/or a semi-automated mechanism depending on implementation choices. In one embodiment, the ejection mechanism 130 can utilize elements and/or functionality provided by the mechanical guide system 125. For example, when the mechanical guide system 125 utilizes a motor for moving the carrier 115, the motor can also be used by the ejection mechanism 130 to provide the locomotive force that ejects the display assembly 110 from the housing 102.

Further, the ejection mechanism 130 can include one or more elements that physically represent the boundary between the operational positioning of the drive assembly 110 (associated with the in-use position 160, the storage position 164, or intermediary positions) and positions of the display assembly 110 specific to the service position 168. For example, a stopper mechanism can be included as part of the mechanical guide system 125, which limits the movement of the carrier 115 to a specific position or set of positions when engaged. When the stopper mechanism is not engaged, an extended (or alternative) set of movement positions for the display assembly 110 can result. Thus, the stopper mechanism can be a safeguard against accidental movement to the service position 168, which can be an unsecure operational position. For example, the service position 168 (in an embodiment having an ejection mechanism 130) can result in the display assembly 110 being ejected from housing 102.

The display assembly 110 can include the carrier 115 and display element 120. The assembly 110 can be treated as a single unit, where a semi-permanent or permanent coupling is established between the carrier 115 and the display element 120. For example, in one embodiment, an adhesive or glue can be used to affix the carrier 115 to the display element 120, which bonds with sufficient strength to make de-coupling the carrier and display element impractical or at least impractical without first removing the assembly 110 from the housing 102. In another embodiment, the carrier 115 and display element 120 can be selectively decoupled from each other. For example, the carrier 115 can be separable into two (or more) portions, which surround (or support) the display element 120. These portions can be attached to each other by one or more screws, bolts, clips, or other fasteners.

The carrier 115 can be a component that adds rigidity or support to the display element 120. In one embodiment, the carrier 115 can include one or more couplers or connectors, which connect the assembly 110 to the mechanical guide system 125. For example, the mechanical guide system 125 can include one or more rails, which a wheel (fitting inside a rail) is coupled to the carrier 115. In another embodiment, a circular void or hole can be included in the carrier, where a guide rail (of the mechanical guide system 125) fits inside the void or hole. In still another embodiment, the carrier 115 can attach to a movable arm, a gear set, or other components of the guide system 125 via a fastener or set of fasteners.

In one embodiment, the display element 120 can be a combiner, which is a transparent panel of a HUD positioned in front of a user to display the visual data 155. A combiner can enable a user to see both a virtual image (e.g., visual data 155) and real-world data concurrently through the (transparent) display element 120. In one embodiment, the combiner can adjust the visual data 155 so that real-world images and virtual images (generated by imaging component 140) are proportioned relative to real-world images seen through the (transparent) display element 120. HUD combiners (such as display element 120 in one embodiment) can be constructed using sandwiched wedge windows, curved dichroic mirrors, volume-holographic plates, plastic casting, and the like. Combiners (e.g., one embodiment of display element 120) can reflect light generated by projector 145 when the HUD is in the in-use position 160. Reflections designed for user viewing from the display element 120 will not occur when the HUD is in the storage position 164 or the service position 168.

The display element 120 can be flat or curved, depending on implementation choices. Further, the display element 120 need not be fully transparent. That is, embodiments exist where display element 120 is semi-transparent and/or opaque.

As mentioned, the display element 120 can be a reflective surface in one embodiment. The reflections can be optionally tuned for specific polarity and/or wavelengths of light, to maximize viewing of projector generated images (visual data 155), while still permitting a viewer to see images through the display element 120 (in embodiments where the display element 120 is transparent or semi-transparent).

The display element can also be implemented as a passive or active electronic matrix display. For example, the display element 120 can be a liquid crystal display (LCD), organic light-emitting diode (OLED), surface-conduction electron-emitter display (SED), a liquid crystal on silicon (LCOS) display, an electrophoretic ink (e-ink) display, and the like.

The technology utilized to ensure human viewable images are presented for viewing on the display element 120 is not especially relevant, so long as: images (visual data 155) are able to be selectively displayed on display element 120 for human viewing when the device, including the surface, is in the in-use position 160; a storage position 164 exists for protecting the display element 120 from environmental harm when a human user is not viewing images (visual data 155) or when the display element 120 is not in-use; and a service position 168 exists that facilitates the removal and replacement of the display assembly 110 (and/or the display element 120) from the housing 102.

Figure 1A:
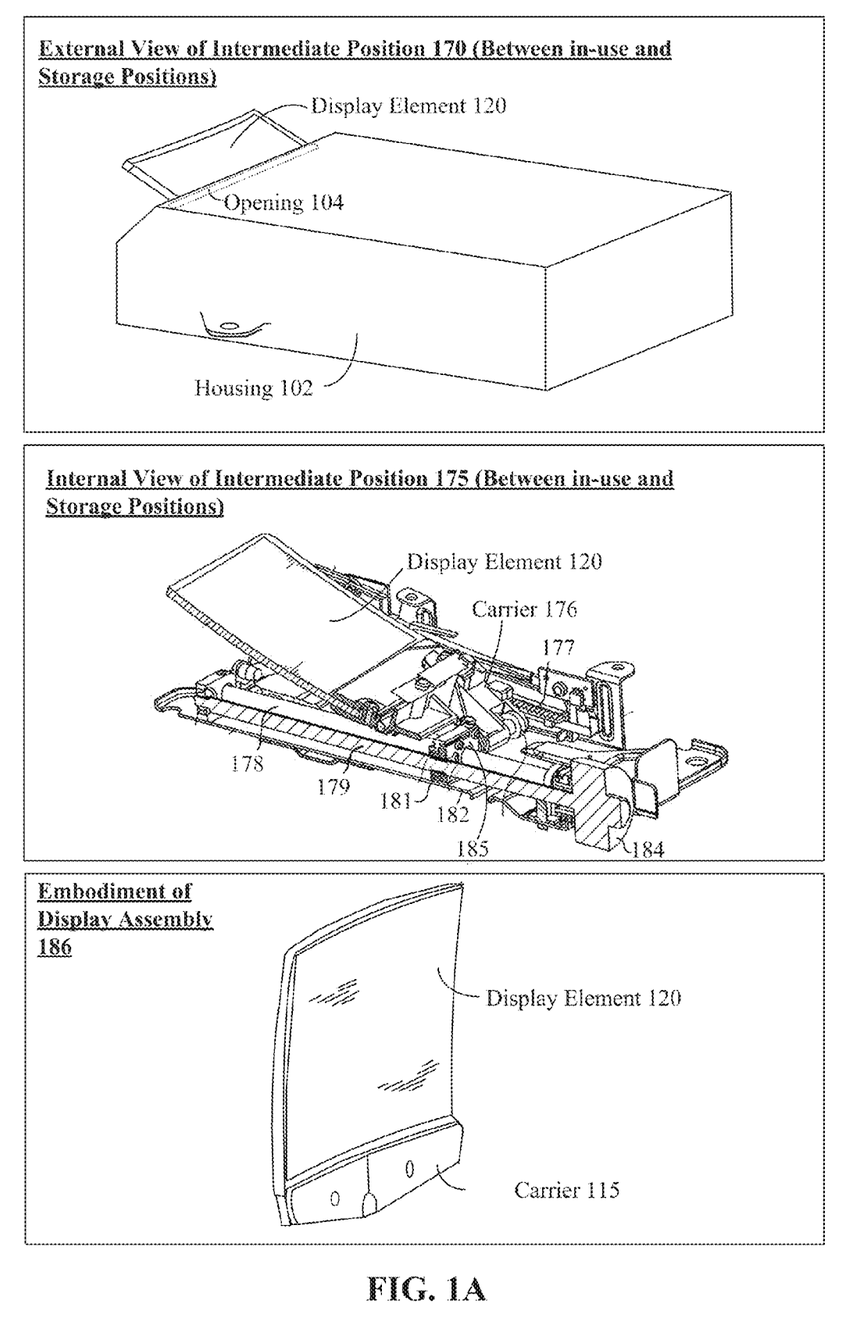
FIG. 1A shows embodiments of a HUD having a service position in accordance with embodiments of the disclosure.

The HUD system 100 having in-use position 160, storage position 164, and service position 168 can be implemented in numerous manners and embodiments. FIG. 1A shows a few embodiments 170, 175, and 186 used for illustrative and non-limiting purposes. That is, these embodiments 170, 175, 186 express concepts detailed herein, but the scope of the disclosure is not to be construed as limited to specifics of the embodiments 170, 175, 186 shown in FIG. 1A.

More specifically, external view (170) and internal view (175) of a HUD housing 102 are consistent with US Patent Publication 2009/0086329 to Potakowskyj, et al. titled "Positioning System for a Combiner in a Head Up Display," details of which are incorporated herein. The external view 170 shows a display element 120 partially emerged from an opening 104 of the housing 102. Specifically, the display element 120 as shown can be in an intermediate position between the in-use position 160 and the storage position 164.

External view 175 of the same HUD in the same intermediate position is more revealing of mechanical guide system 125 components (176-184). That is, the drawing of view 175 shows a display element 120 coupled to a carrier 176, which moves the display assembly 110 (display element 120 and carrier 176) relative to the housing 102. View 175 shows a spindle screw 179, which is parallel to a guide rod 178. The guide rod 178 can be used to guide the carrier 176. The guide rod 178 can be positioned within a bore that is formed in the bearing 185. The bearing 185 can slide along the guide rod 178 to control motion of the carrier 176 as a nut system 181 is moved by the screw spindle 179. The movement direction of the nut system 181 along the y-axis defined by the screw spindle 179 is determined by the clockwise or counter-clockwise rotation direction of the screw spindle 179.

View 175 also shows a base plate 182 of the housing 102, and a motor 184 for turning the spindle screw 179. A gear track 177 and wheel 183 are additional shown components that help move the carrier 176, when the spindle screw 179 is rotated by the motor 184. Further specifics for the illustrated embodiment are detailed in US Patent Publication 2009/0086329, and will not be elaborated upon in additional details herein; as this disclosure focuses upon incorporating the service position 168 to facilitate display assembly 110 removal and replacement, which can be accomplished in a variety of contemplated manners that are not dependent upon specifics expressed in US Patent Publication 2009/0086329.

A portion of the display assembly is shown in view 186, which includes the display element 120 (e.g., a HUD combiner) and carrier 115. It should be emphasized that in one embodiment, an adhesive can couple the display element 120 to the carrier 115, which has advantages such as increasing stiffness/natural frequency of the display element 120. Use of the adhesive can also minimize problems with clamping of plastic combiners (one embodiment of display element 120) used at high temperatures, where material creep can cause a loss of pretension. Additionally, vibration energy can be absorbed and/or damped by selecting the proper adhesive, such as a liquid adhesive in one embodiment. Further, the carrier 115 can include numerous coupling mechanisms for attaching the display assembly 110 to the mechanical guide system 125, such as shown by view 175. The roller 183 and other elements that may be part of the carrier 115 (as shown in view 175) are not shown in view 186 for simplicity of expression.

Figure 1B:
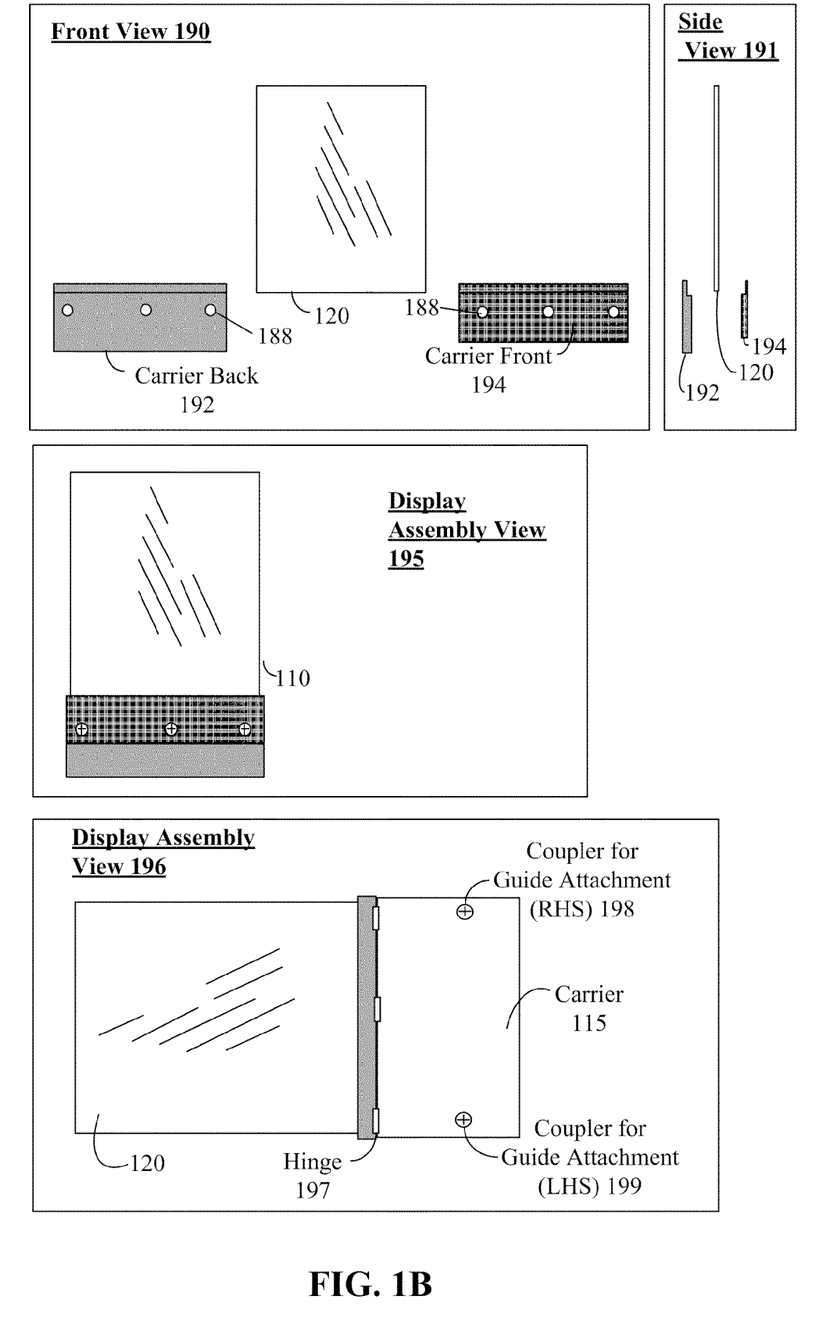
FIG. 1B shows embodiments of a HUD display assembly in accordance with embodiments of the disclosure.

Use of adhesives is one coupling mechanism for forming the display assembly 110 from the carrier 115 and the display element 130 and others are contemplated. In one embodiment, for example, the carrier can be a multi-part carrier that is able to be joined together to contain the display element 120. FIG. 1B shows a two part carrier 115 having a back 192 and a front 194 portion, where the display element 120 fits between. As shown in side view 191, a groove can be included in the back 192 and front 194 portions of the carrier 115 within which the display element 120 fits snugly. Front view 190 shows that both the carrier back 192 and front 194 include coupling mechanism 188, such as a screw/nut coupling mechanism. View 195 shows an assembled view of the assembly 110, where the back 192, display element 120, and front 194 are joined.

View 196 of FIG. 1B shows another embodiment of a display assembly 110 from a different implementation or embodiment of the disclosure. The view 196 shows a carrier 115 joined to a display element 120, where the carrier 115 includes one or more hinges 197. The hinge 197 permits the carrier 115 to be angled (to establish the in-use angle 162, for example). Additional attachment mechanisms, such as a coupler 198 and 199 for affixing a guide attachment (attachment 235, for example) to the carrier 115. That is, the view 196 shows a display assembly 110 consistent with the simplified figures of FIGS. 2, 3, and 4, which express embodiments of the disclosure.

Figure 2:
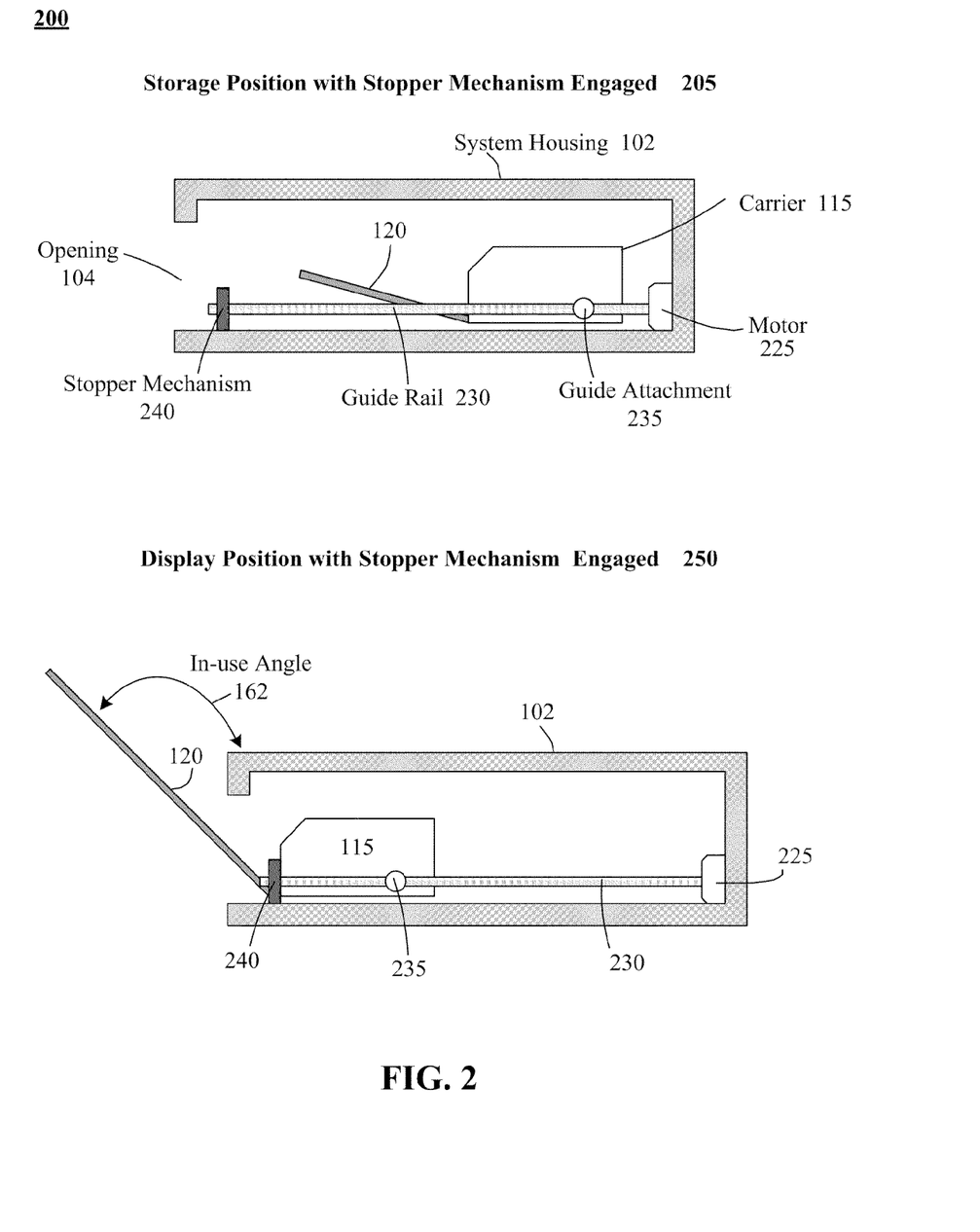
FIGS. 2 and 3 show drawings illustrating operation of the HUD system having an in-use position, a storage position, and a service position in accordance with embodiments of the disclosure.
Figure 3:
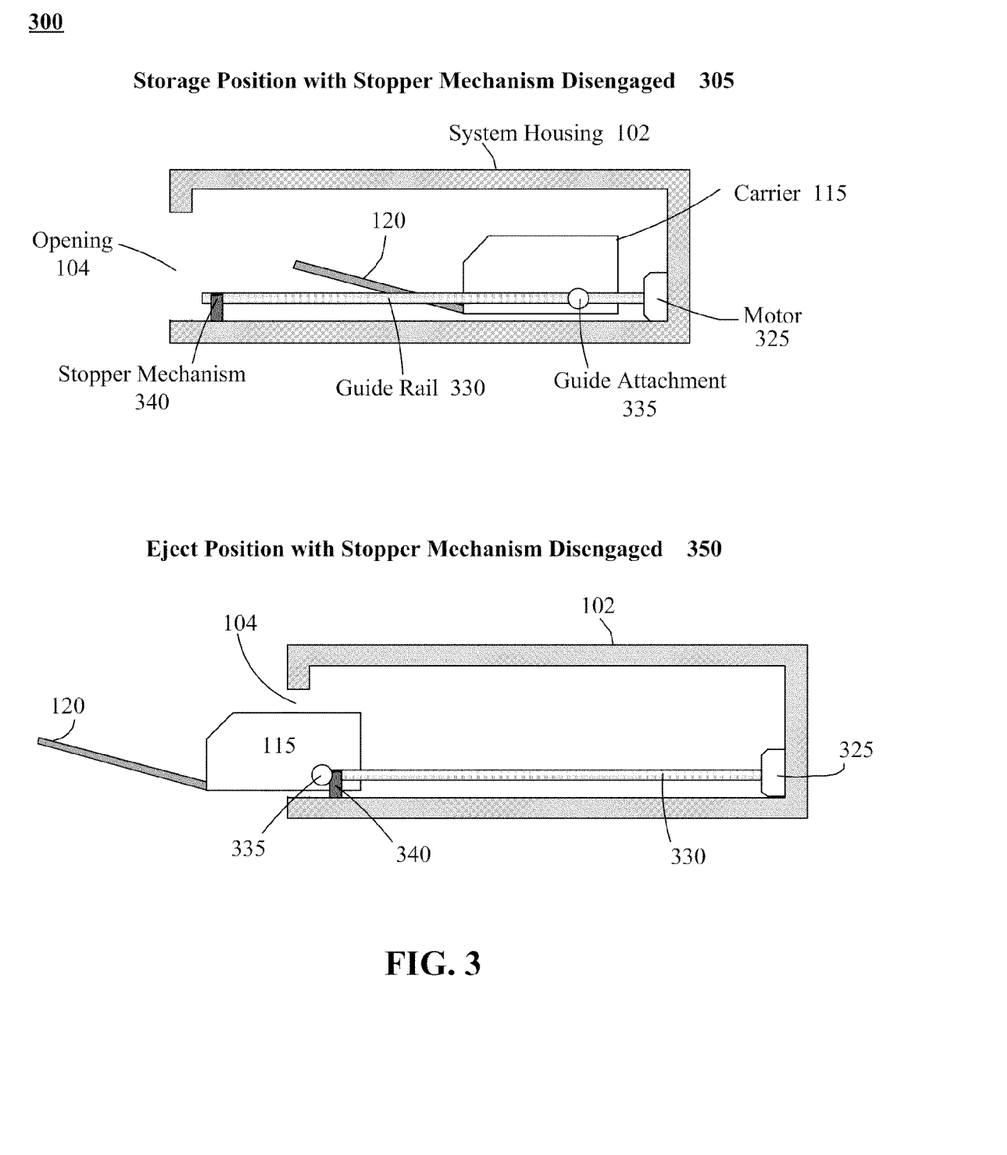

FIGS. 2 and 3 show drawings 205, 250, 305, and 350 illustrating operation of the HUD system (e.g., system 100) having an in-use position 160, a storage position 164, and a service position 168. These drawings 205, 250, 305, 350 are for a HUD embodiment that utilizes a stopper mechanism 240 to inhibit the carrier 115 from moving to the service position 168, when the stopper mechanism 240 is engaged. That is, when the stopper mechanism 240 is engaged, movement of the carrier 115 is restricted to the in-use position 160, the storage position 164, and intermediary positions between the in-use position 160 and storage position 164. It should be understood that embodiments are contemplated, where no stopper mechanism 240 is necessary (embodiment 450, for example).

Drawing 205 illustrates a HUD system in which the display element 120 is in a storage position (position 164), where the display element 120 (e.g., a HUD combiner in one embodiment) is protected. The display element 120 can be protected, for example, within an internal space of the HUD system housing 102. In drawing 205, the stopper mechanism 240 is in an engaged state, which prevents the carrier 115 from moving to the service position 168.

The system housing 102 can represent the physical enclosure for the HUD system and/or specific components of the HUD system. In this example, the HUD system housing 102 can encapsulate the carrier 115, the display element 120 (when in the storage position 164), guide rail 230, motor 225, stopper mechanism 240, and the like. When in the storage position 164, the display element 120 need not be completely enclosed in the system housing 102, but can be partially exposed (i.e., can extend slightly beyond the opening 104, for example). The significance of the storage position 164 (shown in drawing 205) is that the display element 120 is not positioned for use (e.g., is in a non-operational position), but is in a position where the display element 120 is more protected from harm than when it is in the in-use position 160.

As previously discussed, the display element 120 can be coupled (e.g., via an adhesive or other coupling mechanism) to the carrier 115 to form a display assembly 110. The carrier 115 can utilize a guide attachment 235 that connects the carrier 115 to the guide rail 230. The guide rail 230 can represent an element of the mechanical guide system 125 that guides the motion of the carrier 115 within the system housing 102. Motor 225 can provide the locomotive force that moves the carrier 115 along the length of the guide rail 230.

For example, as described in U.S. Patent 2009/0086329 (also shown by drawing 175), the motor 225 can have a drive shaft parallel to the guide rail 230 upon which a screw spindle can be threaded; operation of the motor 225 can then move the screw spindle along the length of the drive shaft, depending upon the rotation of the motor 225 (i.e., clockwise motor 225 rotation moves the screw spindle away from the motor 225, counter-clockwise rotation towards the motor 225). The guide attachment 235 can be represented by an opening in a lateral panel or section of the carrier 115 through which the guide rail 230 passes as the motor 225 or motion system moves the carrier 115.

Thus, the locomotive force provided by the motor 225 can cause the carrier 115 to move along the length of the guide rail 230 via the guide attachment 235, which causes the display element 120 to move to the in-use position 160, to the storage position 164, and to positions in-between.

As shown in drawing 250, carrier 115 can be moved to the opposite end of the HUD system housing 102, causing the display element 120 to pass through opening 104 of the system housing 102. That is, drawing 250 is a simplified diagram of an in-use position 168 for a HUD system having an engaged stopper mechanism 240. One or more hinges (e.g., hinge 197) or other angle creation mechanism can be implemented to ensure that the display element 120 is presented with the proper in-use angle 162, when in the in-use position 168. In one embodiment, the angle 162 of the display element 120 can be adjusted by a user to ensure proper line-of-sight operation.

As shown by diagrams 205 and 250, movement of the carrier 115 within the system housing 102 can be physically limited by the stopper mechanism 240, when it is engaged. The stopper mechanism 240 can be disengaged, which enables the carrier 115 to be moved to the service position 168. As previously noted, the service position 168 can be one in which the display assembly 110 is able to be removed/replaced with relative ease (compared to the in-use position 160 or storage position 164). In other words, the service position 168 can permit the display assembly to be detached from the system housing 102 without having to disassemble the system housing 102. In one embodiment, illustrated in FIG. 3, the service position 168 is one in which the display assembly 110 is ejected from the system housing 102. In one embodiment, this ejection (via the optional ejection mechanism 130) can permit a tool-less removal/replacement of the display assembly 110.

For example, diagram 305 can illustrate a HUD system in a storage position 168 where the stopper mechanism 240 is disengaged. When disengaged, the guide attachment 335 is not impeded by the stopper mechanism 340, as shown by diagram 350, which enables the optical carrier 115 to pass through the opening 104, which is not possible when the stopper mechanism 340 is engaged.

To arrive at the ejection position (service position 168) of drawing 350 from the storage position 164 of drawing 305, the motor 325 can move the optical carrier 115 along the guide rail 330 via the guide attachment 335. A user can grab the freely moving display assembly 110 (display element 120 and carrier 115) in an ejection embodiment, when the display assembly 110 is in the service position 168 (e.g., has been ejected from the housing 102).

It is important to note that the HUD system depicted in drawings 305 and 350 is for illustrative purposes only and it not meant as a limitation to any embodiment of the present invention. A variety of HUD system components and/or configurations can be utilized without departing from the spirit of the present invention, provided that the components and/or configuration at least provides the capability to move the optical carrier 315, and, therefore, combiner element 320.

Figure 4:
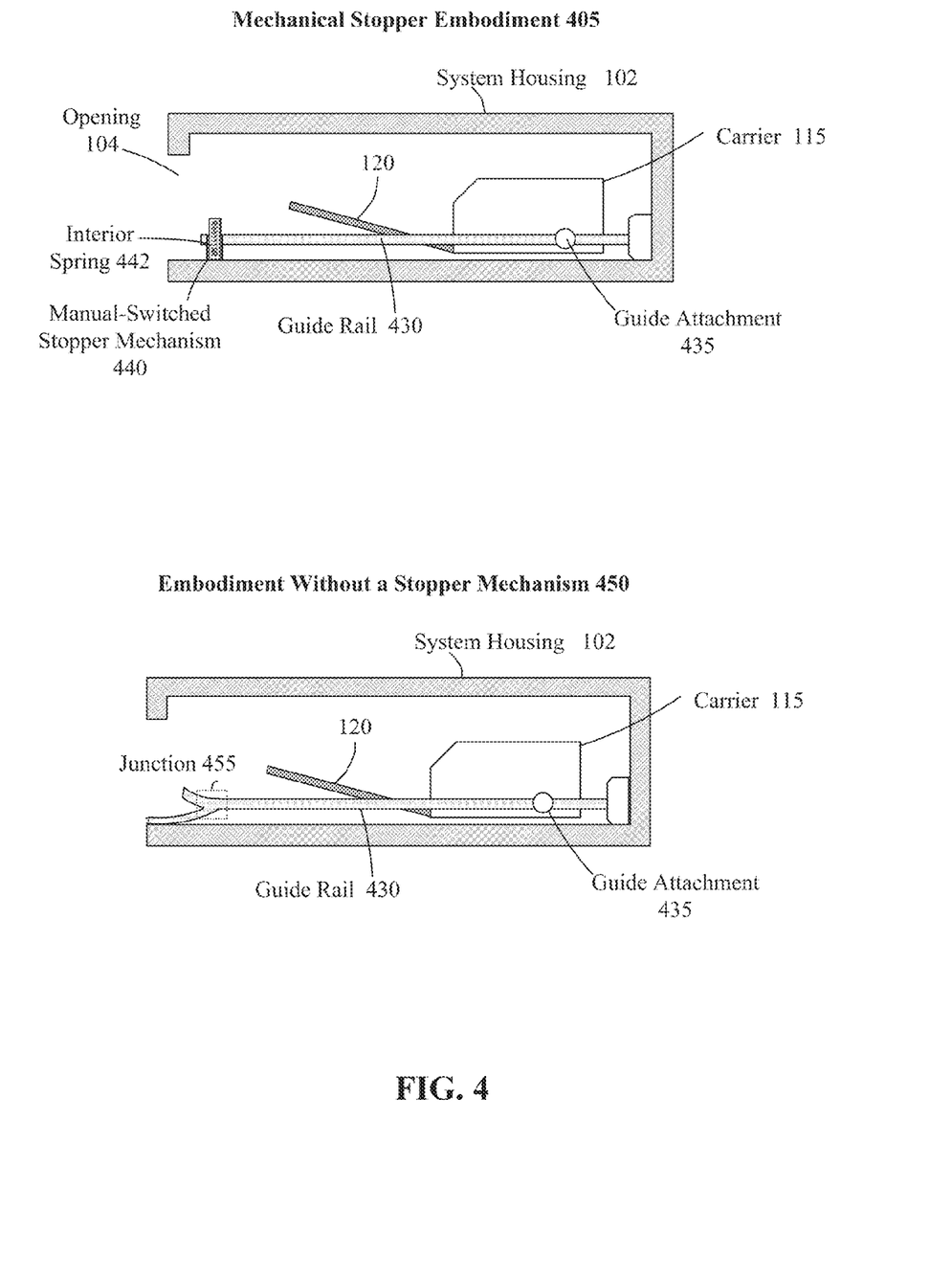
FIG. 4 shows embodiments of the HUD system in accordance with embodiments of the inventive arrangements disclosed herein.

FIG. 4 shows embodiments of the HUD system in accordance with embodiments of the inventive arrangements disclosed herein. More specifically, FIG. 4 shows a mechanical stopper embodiment 405 of the HUD system, for example. Embodiment 405 includes a system housing 102 with an opening 104, guide rail 430, guide attachment 435, carrier 415, and display element 120, which are consistent with previously shown embodiments. Embodiment 405 shows a manual switched stopper mechanism 440, which permits a manual user action to cause the stopper to move between the engaged and disengaged position. Multiple different mechanical mechanisms can be utilized for this purpose. For example, in one embodiment, an interior coil spring 442 can be placed in mechanism 440, which can be compressed to a disengaged position. The coil spring 442 can expand (when not pressed downward) making an engaged position the mechanism's default position.

Drawing 450 shows an embodiment without a stopper mechanism. Specifically, a junction point 455 can be established in the guide rail 430, which establishes one track for ejecting the carrier 115 (and display element 120) thereby placing the display assembly 110 in a service position 168, and a different "operational" track for the in-use position 160.

It should be emphasized that many different mechanical arrangements are possible for implementing the service position 168, and that the disclosure is not to be construed as limited to any specific arrangement of FIGS. 2, 3, and/or 4. For example, in one embodiment, the guide rail 430 can be a cantilever supported at the motor end of the housing, which is able to be moved to extract the display assembly 110 when in the service position, but which otherwise guides the carrier between the storage position 164 and the in-use position 160.

Figure 5:
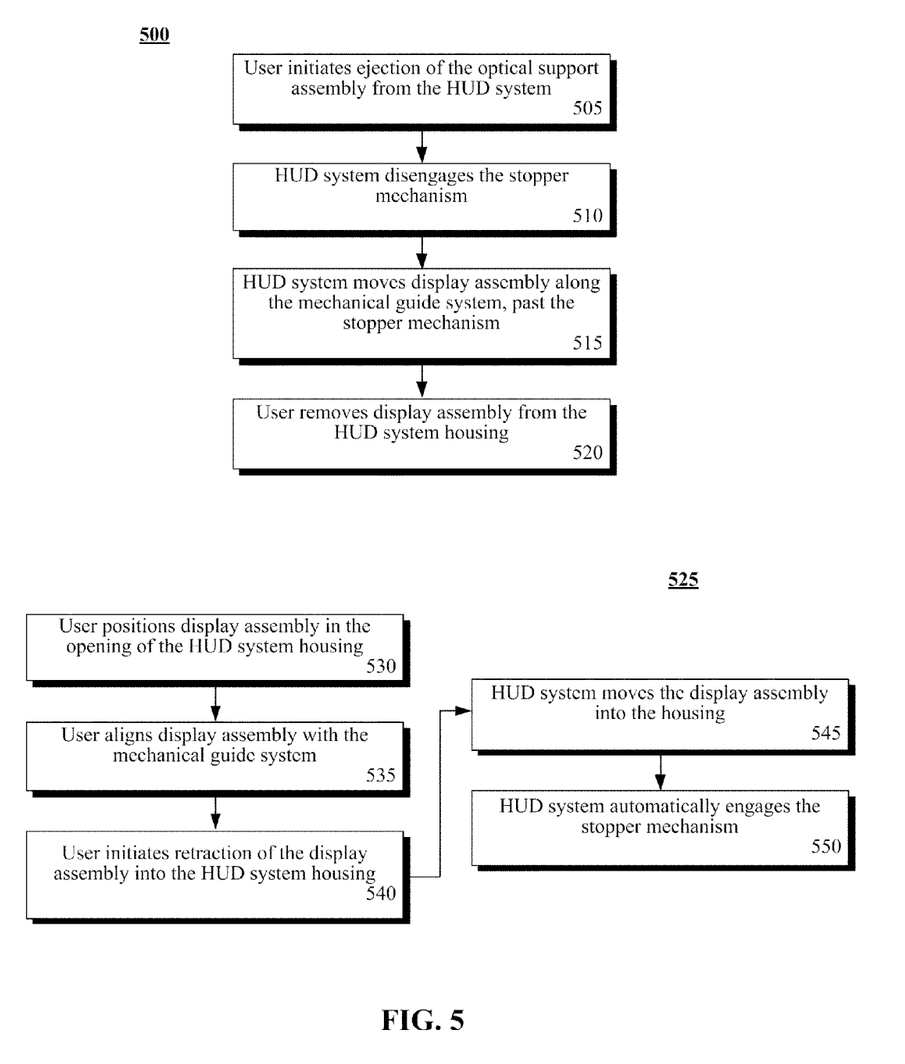
FIG. 5 contains flow charts of methods for facilitating removal of the display assembly when the HUD system is in a service position in accordance with embodiments of the disclosure.

FIG. 5 contains flow charts of methods 500 and 525 for facilitating removal of the display assembly 110 when the HUD system is in a service position in accordance with embodiments of the disclosure.

Method 500 describes the ejection process of the display assembly (in an embodiment where the service position 168 is an ejection position). Method 500 can begin in step 505 where the user initiates the ejection of the display assembly from the HUD system. Alternately, step 505 can be executed by another electronic system capable of communicating with and providing commands to the HUD system.

For example, in an automotive service setting, the automobile being serviced can be connected to a diagnostic computer. As part of the service process, the diagnostic computer can instruct the HUD system to eject the display assembly.

In response to step 505, the HUD system can disengage the stopper mechanism (if one is included in the HUD system) in step 510. In step 515, the HUD system can move the display assembly along the mechanical guide system, past the stopper mechanism, as illustrated in drawing 350 of FIG. 3. The user can then remove the display assembly from the HUD system housing in step 520.

Method 525 can describe the installation process of the display assembly. Method 525 can begin in step 530 where the user positions the display assembly in the opening of the HUD system housing. The user can align the display assembly with the mechanical guide system in step 535.

In step 540, the user can initiate the retraction of the display assembly into the HUD system housing. Alternately, step 540 can be automated through the use of sensor components that sense the insertion of the display assembly without impeding the display assembly.

For example, step 540 can be triggered when the display assembly breaks a light beam being sent to a photoelectric sensor that spans the opening of the HUD system housing.

The HUD system can then move the display assembly into the housing, such as to the storage position, in step 545. In step 550, the HUD system can automatically engage the stopper mechanism.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An apparatus for a head up display (HUD) system comprising:
   a housing containing optical and electronic components that support a head up display function;
   a display assembly captured by the housing, the display assembly having a display element for conveying head-up display information and a carrier that structurally supports the display element,
   a mechanical guide system operable to move and guide the display assembly to an in-use position, a storage position, and a service position;

wherein when in said service position, the display assembly is removable from the housing without disassembly of the housing;

wherein when not in said service position, the display assembly is movable between the in-use position in which the display element is substantially exposed outside the housing but physically secured by the housing, and the storage position in which the display assembly is substantially enclosed and protected by the housing.

2. The apparatus of claim 1, wherein the display element is a combiner of the head up display that reflects light from a projector.

3. The apparatus of claim 1, wherein the display element is a curved mirror that reflects light from a projector, wherein said curved mirror is affixed to the carrier via an adhesive.

4. The apparatus of claim 1, wherein the display element is a surface of an electronic matrix display.

5. The apparatus of claim 1, wherein the service position is a position in which a fastener joining the display assembly to the housing is exposed so that the fastener is able to be accessed, wherein the fastener is not exposed when the display assembly is in the in-use position, the storage position, or intermediary positions between the in-use position and the storage position.

6. The apparatus of claim 1, further comprising:
an ejection mechanism, which when activated causes the display assembly to be disengaged from the mechanical guide system so that the display assembly is able to be removed by hand from the housing of the head up display (HUD).

7. The apparatus of claim 1, wherein the in-use position is a position in which the display element is presented within a field of view of a user, wherein the storage position in a position in which the display element is not presented within the field of view of the user and wherein a level of protection is afforded by the housing that prevents damage to the display element compared to a lesser degree of protection afforded to the display element when in the in-use position or when in the service position.

8. The apparatus of claim 1, further comprising:
a stopper mechanism having an engaged and a disengaged position, wherein when the stopper mechanism is in the engaged position, the display assembly is unable to move to the service position but is able to move to the in-use position, to the storage position, and to intermediate positions between the in-use position and the storage position, wherein when the stopper mechanism is in the disengaged position, the display assembly is able to move to the service position.

9. The apparatus of claim 1, wherein the mechanical guide system comprises:
the guide element for guiding motion of the carrier within the housing;
a mechanism for providing locomotive force that moves the carrier along a length of the guide element; and
a stopper mechanism having an engaged and a disengaged position, wherein when the stopper mechanism is in the engaged position, a range of motion of the carrier along the guide element is restrained so that the display assembly is unable to be moved to the service position, wherein when the stopper mechanism is engaged, the range of motion of the carrier permits the display assembly to be moved to the in-use position and to the storage position, and wherein when the stopper mechanism is in the disengaged position, the range of motion of the carrier along the guide element permits the display assembly to be moved to the service position.

10. An apparatus for facilitating maintenance of a display assembly comprising:
a system housing representing a physical enclosure containing a mechanical guide system, wherein said system housing comprises an opening through which a display element selectively protrudes; and
the mechanical guide system for moving a display assembly comprising the display element and a carrier to an in-use position, a storage position, and a service position, wherein when the display assembly is in the in-use position, the display element protrudes from the opening of the system housing so that a user is able to view visual data selectively presented on the display element; wherein when the display assembly is in the storage position, the display element is at least partially contained within the system housing, and wherein when the display assembly is in the service position, the display element is able to be removed or replaced without disassembling the system housing.

11. The apparatus of claim 10, wherein the removal or replacement of the display element when in the in-use position, the storage position, or intermediary positions between the in-use position and the storage position requires disassembly of the system housing.

12. The apparatus of claim 10, wherein the in-use position is a position in which the display element is presented within a field of view of a user, wherein the storage position in a position in which the display element is not presented within the field of view of the user and wherein a level of protection is afforded by the housing that prevents damage to the display element compared to a lesser degree of protection afforded to the display element when in the in-use position or when in the service position.

13. The apparatus of claim 10, further comprising:
an ejection mechanism that when activated causes the display assembly to be decoupled from the mechanical guide system and to be ejected from the opening of the system housing.

14. The apparatus of claim 10, wherein the display element is a mirror of a head up display (HUD) that reflects the visual data provided by a projector for viewing by the user when the display assembly is in the in-use position.

15. The apparatus of claim 10, wherein said mechanical guide system further comprises:
the guide element for guiding motion of the carrier within the system housing; and
a mechanism for providing locomotive force that moves the carrier along a length of the guide element, thereby adjusting the display assembly between the in-use position, the storage position, and the service position.

16. The apparatus of claim 15, wherein the mechanical guide system further comprises:
a stopper mechanism having an engaged and a disengaged position, wherein when the stopper mechanism is in the engaged position, a range of motion of the carrier along the guide element is restrained so that the carrier is unable to move the display assembly to the service position, wherein when the stopper mechanism is in the engaged position, the carrier has a range of motion along the guide element permitting the display assembly to move to the storage position, the in-use position, and intermediate positions between the storage position and the in-use position.

17. The apparatus of claim 16, wherein when the stopper mechanism is in the disengaged position, the carrier is able to be removed from the system housing through the opening, which is not possible when the stopper mechanism is in the engaged position.

18. The apparatus of claim 10, wherein the display element is a combiner of a head up display (HUD) that reflects light from a projector.

19. The apparatus of claim 10, wherein the display element is a curved mirror that reflects light from a projector, wherein said curved mirror is affixed to the carrier via an adhesive.

20. The apparatus of claim 10, wherein the display element is a surface of an electronic matrix display.

21. A method for replacing a display assembly of a head up display system comprising:

activating of an ejection mechanism of a head up display (HUD) system, wherein said ejection mechanism utilizes an adjustable stopper mechanism for limiting movement of a display assembly within the HUD system, such that activation of the ejection mechanism changes the stopper mechanism from an engaged state where the display assembly is not able to be ejected to a disengaged state where the display assembly is able to be ejected, wherein the display assembly comprises a carrier and a display element;

responsive to activating the ejection mechanism, ejecting the display assembly through an opening in a housing of the HUD system;

removing of the display assembly from the opening of the HUD system, wherein the opening of the HUD system is the same opening from which the display element protrudes when the HUD system is in an in-use position; and inserting of a different display assembly into the opening of the HUD system, wherein the different display assembly replaces the display assembly that was ejected, wherein after the inserting a state of the adjustable stopper mechanism is changed from the disengaged state to the engaged state.

22. The method of claim 21, wherein activating of the ejection mechanism utilizes at least one of a mechanical button, a mechanical switch, an electronic switch, a function of a software application, and a mechanical dial.

23. The method of claim 21, wherein the ejection mechanism uses a motor to eject the display assembly, wherein the motor is the same motor used to selectively move the display assembly to the in-use position and to a storage position.

24. The method of claim 23, when the display assembly is in the in-use position, the display element protrudes from the opening of the system housing so that a user is able to view visual data selectively presented on the display element; wherein when the display assembly is in the storage position, the display element is at least partially contained within a system housing of the HUD system.

25. The apparatus of claim 1, wherein the service position is different than the in-use position and the storage position.

* * * * *

UNITED STATES PATENT AND TRADEMARK OFFICE
CERTIFICATE OF CORRECTION

| | | |
|---|---|---|
| PATENT NO. | : 8,749,889 B2 | Page 1 of 1 |
| APPLICATION NO. | : 13/162314 | |
| DATED | : June 10, 2014 | |
| INVENTOR(S) | : Christoph Potakowskyj et al. | |

It is certified that error appears in the above-identified patent and that said Letters Patent is hereby corrected as shown below:

IN THE CLAIMS

In column 12, line 42, claim 14, delete "minor" and insert -- mirror --

Signed and Sealed this
Eleventh Day of November, 2014

Michelle K. Lee
*Deputy Director of the United States Patent and Trademark Office*